United States Patent [19]

Antognini

[11] Patent Number: 5,194,787
[45] Date of Patent: Mar. 16, 1993

[54] CONTROL CIRCUIT FOR AN ELECTRIC MOTOR WITHOUT A COLLECTOR

[75] Inventor: Luciano Antognini, Corcelles, Switzerland

[73] Assignee: Portescap, La Chaux-de-Fonds, Switzerland

[21] Appl. No.: 612,209

[22] Filed: Nov. 13, 1990

[30] Foreign Application Priority Data

Nov. 10, 1989 [CH] Switzerland .................. 4059/89-0

[51] Int. Cl.$^5$ .............................................. H02P 8/00
[52] U.S. Cl. .................................... 318/254; 318/439
[58] Field of Search ............... 318/696, 139, 138, 254, 318/439, 794, 71

[56] References Cited

U.S. PATENT DOCUMENTS

| | | | |
|---|---|---|---|
| 3,831,072 | 8/1974 | Tanikoshi | 318/138 |
| 4,608,958 | 9/1986 | Sakakibara et al. | 318/696 |
| 4,799,002 | 5/1987 | Matsumoto | 318/696 |
| 4,888,533 | 12/1989 | Gotoh et al. | 318/71 |
| 4,900,993 | 2/1990 | Yasohara et al. | 318/254 |
| 5,032,781 | 7/1991 | Kronenberg | 318/696 |

Primary Examiner—Stanley J. Witkowski
Assistant Examiner—John W. Cabeca
Attorney, Agent, or Firm—Woodard, Emhardt, Naughton, Moriarty & McNett

[57] ABSTRACT

The present invention is concerned with a control circuit for an electric motor without a collector, of the type comprising a rotor magnetized in such a manner as to display at least one pair of magnetic poles, and a stator provided with a two- or a polyphase winding comprising several elementary coils of the same impedance, this circuit comprising electronic commutation means arranged for connecting selectively the elementary coils according to a cycle of successive supply states, to the terminals of a current source, under the effect of a commutation control signal, means for detecting the voltages appearing at the terminals of elementary coils or of groups of elementary coils and means for generating from the detected voltages, the commutation control signal.

7 Claims, 4 Drawing Sheets

CONTROL CIRCUIT FOR AN ELECTRIC MOTOR WITHOUT A COLLECTOR

The present invention is concerned with a control circuit for an electric motor without a collector, of the type comprising a rotor magnetized in such a manner as to display at least one pair of magnetic poles, and a stator provided with a two- or a polyphase winding comprising several elementary coils of the same impedance, this circuit comprising electronic commutation means arranged for connecting selectively the elementary coils according to a cycle of successive supply states, to the terminals of a current source, under the effect of a commutation control signal, means for detecting the voltages appearing at the terminals of elementary coils or of groups of elementary coils and means for generating from said detected voltages, said commutation control signal.

A control circuit of this type was described for a three-phase motor, the elementary coils of which are star-connected, in the U.S. Pat. No. 4,743,815. This circuit detects the passage through zero of the back-electromotive force induced by the rotor in an elementary coil, which is not supplied with current, and uses a microprocessor for defining from this passage through zero, the desired commutation point. Such a circuit is only applicable to the case of a motor of the type described and requires means for producing an appropriate commutation signal, which are relatively important.

The present invention is aimed at providing a control circuit which can be used for two- or polyphase motors, the elementary coils of which are series connected and are all thus supplied in power at each supply state of the motor. More particularly, its purpose is to permit the detection of a position of the rotor situated clearly ahead of the position detected by the known circuit and to permit the generation of a commutation signal by means which are particularly simple and economical. Another purpose of the invention is to obtain such a commutation signal, irrespective of the form of the current supplied to the motor.

For this purpose, the circuit according to the invention has the features mentioned in the characterization part of claim 1. Claims 2 to 7 describe specific embodiments of the circuit according to the invention.

The objects, advantages and features of the invention will be more apparent from the following description of different embodiments, given by way of example and illustrated in the appended drawing, in which.

Figure 1:
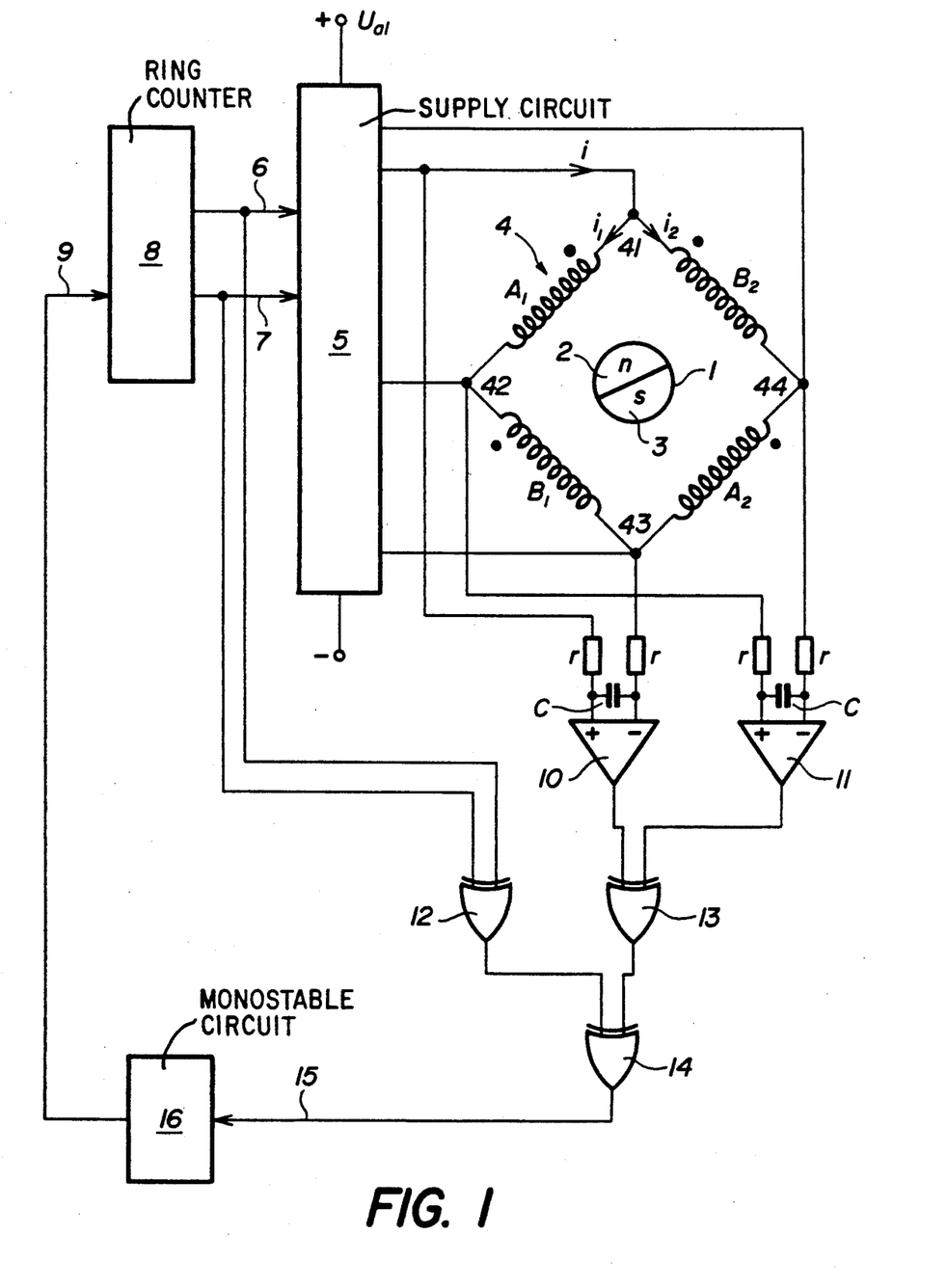
FIG. 1 is a diagram of the control circuit according to the invention, in the case of a two-phase motor.

In the diagram of FIG. 1 there is shown symbolically the rotor 1 of a two-phase motor, which rotor is magnetized in such a manner as to display generally a certain number of pairs of magnetic poles n, s, represented by a single pair of poles 2 and 3. The stator of the motor according to FIG. 1 comprises a winding formed by four elementary coils, of which the coils $A_1$ and $A_2$ belong to a first phase A and the coils $B_1$ and $B_2$ belong to the second phase B, in quadrature with the first one. These elementary coils are series connected and have the common connection points 41, 42, 43, 44. The direction in which these coils are wound is indicated by a point and it is to be noted that coils, such as those represented, are oriented consecutively in the same direction. As shown in FIG. 1, the elementary coils of a same phase are found in opposite branches of the circuit 41, 42, 43 44. When a constant current flows through these coils, the coils of phases A and B generate, respectively, moments $M_a$ and $M_b$ which vary with the mechanical position $\alpha$ of the rotor, and they can be expressed by the following relation:

$$M_a = K \sin N\alpha$$

$$M_b = K \cos N\alpha$$

where K is a constant dependant upon the proper characteristics of the magnetic circuit and of the coils associated to each phase, and N is the number of pole pairs of the rotor. This purely sinusoidal expression for the couple is chosen here solely by way of example and for the needs of the present description, the principle of the operations of the present control circuit being also applicable to motors with any type of law giving the moment. The variation of the moments $M_a(N\alpha)$ and $M_b(N\alpha)$ is represented in the diagram of FIG. 2 by the curves A and B for an arbitrary positive direction of the current, such as the direction of the currents $i_1$ and $i_2$ according to FIG. 1. For the opposite direction of the current, the corresponding moments are shifted by 180°, as indicated by the curves $\overline{A}$ and $\overline{B}$.

In the present motor with a rotor having a permanent magnet, each phase A and B is the site of an induced movement voltage, which can be written, respectively, in the following form $$U_{ma} = K_o \omega \sin N\alpha \text{ and}$$

$$U_{mb} = K_o \omega \cos N\alpha$$

where $\omega$ represents the mechanical rotational speed of the rotor, expressed in radians per second. These induced voltages can thus be represented in function of time t by the same curves A and B of FIG. 2.

Assuming that each elementary coil has an inductance L and an ohmic resistance R, that the mutual inductance between the elementary coils of a same phase is $L_{12}$ and that the magnetic circuit displays a linear behavior, the voltages appearing at the terminals of, respectively, coils $A_1$, $B_1$, $A_2$, $B_2$, are expressed, in the case of the supply state AB in which a supply voltage $+U_{al}$ applied between the terminals 41 and 43, as follows $$U_{a1} = Ri_1 + Ldi_1/dt + L_{12}di_2/dt + U_{ma}$$

$$U_{b1} = Ri_1 + Ldi_1/dt + L_{12}di_2/dt + U_{mb}$$

$$U_{a2} = Ri_1 + Ldi_2/dt + L_{12}di_1/dt + U_{ma}$$

$$U_{b2} = Ri_2 + Ldi_2/dt + L_{12}di_1/dt + U_{mb}$$

$i_1$ and $i_2$ being the currents in the respective branches 41, 42, 43 and 41, 44, 43 of FIG. 1. Since $$U_{41,43} = U_{a1} + U_{b1} = U_{a2} + U_{b2}$$

therefore $$i_1 = i_2 = i/2$$

i designating the total current between the terminals 41 and 43.

Under these conditions, the voltage between the terminals 42 and 44 is $$U_{42,44} = U_{b1}U_{a2} = Ri/2 + Ldi/2dt + L_{12}di/2dt + U_{mb} - Ri/2 - Ldi/2dt - L_{12}di/2dt - U_{ma}$$

and hence $$U_{42,44} = U_{mb} - U_{ma}$$

while $$U_{42,44} = -U_{a1}.$$

The motor passing through the supply states AB, $\overline{A}$B, $\overline{A}\overline{B}$, A$\overline{B}$, it is found, similarly, in the supply state $\overline{A}$B in which the supply voltage $+U_{a1}$ is applied between the terminals 42 and 44, i.e. when $$U_{42,44} = +U_{a1},$$

that $$U_{41,43} = U_{ma} + U_{mb}.$$

Similarly, in the following state $\overline{A}\overline{B}$ $$U_{41,43} = -U_{a1} \text{ and}$$

$$U_{42,44} = U_{mb} - U_{ma}$$

and, in the state A$\overline{B}$ $$U_{42,44} = -U_{a1} \text{ and}$$

$$U_{41,43} = U_{ma} + U_{mb}.$$

One will note that the voltages $U_{41,43}$ and $U_{42,44}$ undergo passages through zero associated directly to well defined mechanical positions of the rotor. In actual fact $$U_{41,43} = U_{ma} + U_{mb} = K_0\omega(\sin N\alpha + \cos N\alpha) = 0$$

for $$N\alpha = +\pi/4 \pm n] \text{ and}$$

$$U_{42,44} = U_{mb} - U_{ma} = K_0\omega(\cos N\alpha - \sin N\alpha) = 0$$

for $$N\alpha = +\pi/4 \pm n\pi.$$

In FIG. 2, the variations in time of the voltages $U_{41,43}$ and $U_{42,44}$ have been represented and the four particular positions of the rotor per supply cycle which correspond to the instants of passage through zero $t_1$, $t_2$, $t_3$, $t_4$ of these voltages have been indicated by $N\alpha_1$, $N\alpha_2$, $N\alpha_3$, $N\alpha_4$.

According to the diagram of FIG. 1, the four terminals 41, 42, 43, 44 of winding 4 are connected to a supply circuit 5 of a known construction, supplied from an external current source $U_{a1}$ and controlled by logical signals which are applied thereto through the lines 6 and 7, in such a manner as to define the above-mentioned four supply states AB, $\overline{A}$B, $\overline{A}\overline{B}$ and A$\overline{B}$. These logical signals are generated by a ring counter 8 which causes the transition from one state to another in a defined sequential order, each time it receives at one input, connected through a line 9 to a monostable circuit 16, a commutation control pulse.

The terminals 41 and 43 are further connected to the inputs of a first comparator 10 and the terminals 42 and 44 to the inputs of a second comparator 11. The outputs of these comparators are connected to the respective outputs of a first exclusive logical OR gate 13.

The logical signals appearing on the lines 6, 7 are applied to the inputs of a second exclusive logical OR gate 12 and the outputs of the gates 12 and 13 are connected to the inputs of a third exclusive logical OR gate 14. The output of this gate 14 is connected through a line 15 to the monostable circuit 16.

The operations of this control circuit are explained by consulting the variations of the voltages $U_{41,43}$ and $U_{42,44}$, according to FIG. 2. In the AB supply state, the comparator 10 detects a positive differential voltage at its inputs and consequently delivers at its output, a signal corresponding to a logical state 1. The comparator 11 receives the voltage $U_{42,44}$ which at an instant $t_o$, according to FIG. 2, is negative, so that this comparator outputs a logical signal 0. The output of the exclusive OR gate 13 is therefore in state 1.

The signals output from the circuit 84 in this supply state, generate states 1, 1 at the respective inputs of the exclusive OR gate 12, so that the output thereof is in state 0 and the output of the gate 14 is, consequently, in state 1.

At the instant $t_1$, when the rotor passes through the position $N_1$, $U_{ma}(t_1) = U_{mb}(t_1)$ and the voltage $U_{42,44}$ at the input of the gate 11 changes in sign. This results in a transition at the output of this gate which in turn causes a change in the state of the output of the gate 14 This transition on the line 15 produces, through the circuit 16, a commutation control pulse which actuates the ring counter 8 and causes the commutation of the supply state from AB to $\overline{A}$B. This causes the gate 12 to change from the output state 0 to state 1, the effect of which is to change the output state of the gate 14 from 0 to 1, the signals of the comparators 10 and 11 not being influenced by the change in the supply state.

The counter 8 can be constructed so as to react to the back side of the pulse generated by the monostable circuit 16, the choice of the duration of this pulse permits the defining of the exact instant of the commutation, according to the particular application. Another solution for optimizing the instant of the commutation, consists in providing a delay circuit at the inputs of the comparators, such as a RC circuit formed by the resistors r and the capacitors C, as shown in FIG. 1. In this context, it is important to note that the passages through zero of the voltages $U_{41,43}$ and $U_{42,44}$ occur significantly earlier than the corresponding passage through zero of, for example, the induced voltage $U_{ma}$.

Once the aforementioned commutation from state AB to state $\overline{A}$B has occurred, it is the comparator 10, to which is applied the voltage $U_{41,43}$, which will detect the next particular position of the rotor $N\alpha_2$ at the instant $t_2$. As the state of the output of 10 changes, a new transition of the output signal of 14 occurs from the logical state 1 to the logical state 0. The detection of the other positions $N\alpha_3$ and $N\alpha_4$ takes place in quite a similar fashion.

The arrangement of the logical gates according to the diagram of FIG. 2 provides a means for associating in a particularly simple way, to each transition from state 1 to state 0 of the output signal of gate 14, the detection of one of the above-mentioned particular positions of the rotor.

It should be noted, that the operations of the present control circuit do not depend upon the form of the current flowing through the winding and that the motor can, for example, be supplied from a source of chopped current.

Figure 3:
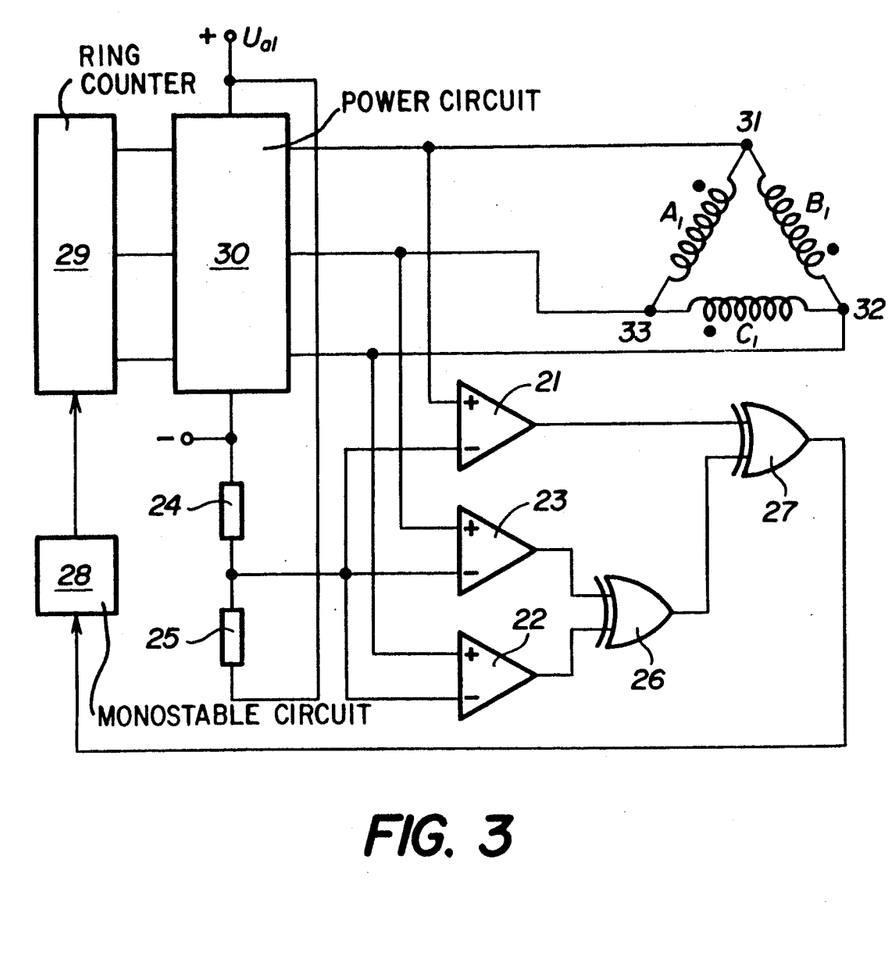
FIG. 3 is a diagram of a control circuit according to the invention, for a three-phase motor.

FIG. 3 is a diagram of a similar control circuit, used in the case of a three-phase motor with three elementary coils $A_1$, $B_1$, $C_1$ triangularly connected between the terminals 31, 32, 33.

Figure 5:
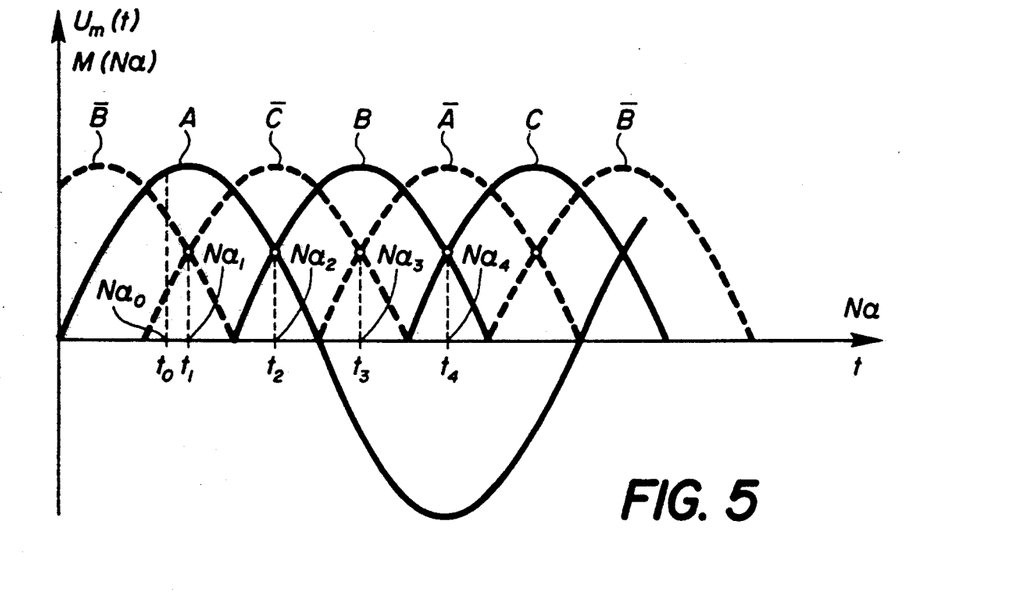
FIGS. 5 and 6 are diagrams representing the variation of the moments and voltages induced in the case of, respectively, three- and five-phase motors.

The moment M ($N\alpha$) associated with each phase A, B and C, is represented in FIG. 5 by the curves designated $\overline{A}$, or A, $\overline{B}$ or B, $\overline{C}$ or C, according to the direction of the current in the coils which are concerned. The direction of the winding of these coils was indicated by a point in FIG. 3, as previously.

In the A, $\overline{B}$, $\overline{C}$ supply state for example, a supply voltage $+U_{a1}$ is applied between the terminals 31 and 33, so that the current flowing in the coil $A_1$ is positive, and negative in the coils $B_1$ and $C_1$. If one considers the instant $t_o$ in FIG. 5, these three currents all generate positive moments in the $N_o$ position of the rotor. At the instant $t_1$ indicated in FIG. 5, the voltages $U_m$ induced in the coils $B_1$ and $C_1$ represented by the curves $\overline{B}$ and $\overline{C}$, are equal, which permits the detection of the corresponding position $N\alpha_1$ of the rotor. Similarly, one can detect particular positions $N\alpha_2$, $N\alpha_3$, $N\alpha_4$, etc, which are shifted by 60° with respect to each other, so that six particular positions are detected at each complete cycle.

The circuit of FIG. 3 permits that this detection and that the control of the commutation be carried out in a particularly simple and economical fashion.

This circuit comprises three comparators 21, 22, 23, a first input of which is connected to, respectively, the terminals 31, 32, 33 of the winding $A_1$, $B_1$, $C_1$ and the second inputs of which are connected to a common median point of a voltage divider represented by two resistors 24, 25 series connected between the + and the − terminals of the current supply source. The outputs of the comparators 22 and 23 are connected to respective inputs of a first exclusive logical OR gate 26, the output of which is in turn connected to an input of a second exclusive logical OR gate 27. The second input of this second gate is connected to the output of the comparator 21. The output of the gate 27 controls a monostable circuit 28, the output signal of which is applied to a ring counter 29. The latter delivers commutation signals to a power circuit 30, such as a transistor bridge, which applies the supply voltage, according to the successive supply states, to two of the terminals 31, 32, 33 of the winding, according to a well known technique.

In view of the description given above, one can easily see that in each supply state, two of the comparators 21, 22, 23 display a 0 state at their output, because two of the three terminals 31, 32, 33 are at a potential defined by the voltage supply source. The third terminal, which is floating, permits the detection of the instant when the voltages induced in the coils temporarily series connected between the terminals of the voltage supply source, are equal. Thus, in the $A\overline{B}\overline{C}$ supply state, the comparators 21 and 23 will have, respectively, the output states 1 and 0, while the comparator 22 will move from output state 1 to output state 0 at the moment when the rotor passes through the position $N\alpha_1$. This transition will causes a transition of the output state of the gate 26 from 0 to 1 and, consequently, a transition of the output state of the gate 27 from 0 to 1. In a fashion similar to that of the case described previously, the monostable circuit will be actuated by this latter transition and actuate the counter 29 to produce a change in the supply state.

Figure 4:
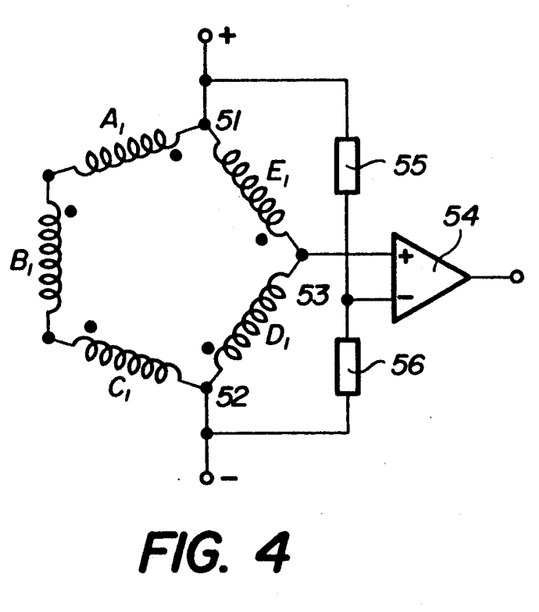
FIG. 4 is a partial diagram illustrating the application of the circuit according to the invention to a five-phase motor.
Figure 6:
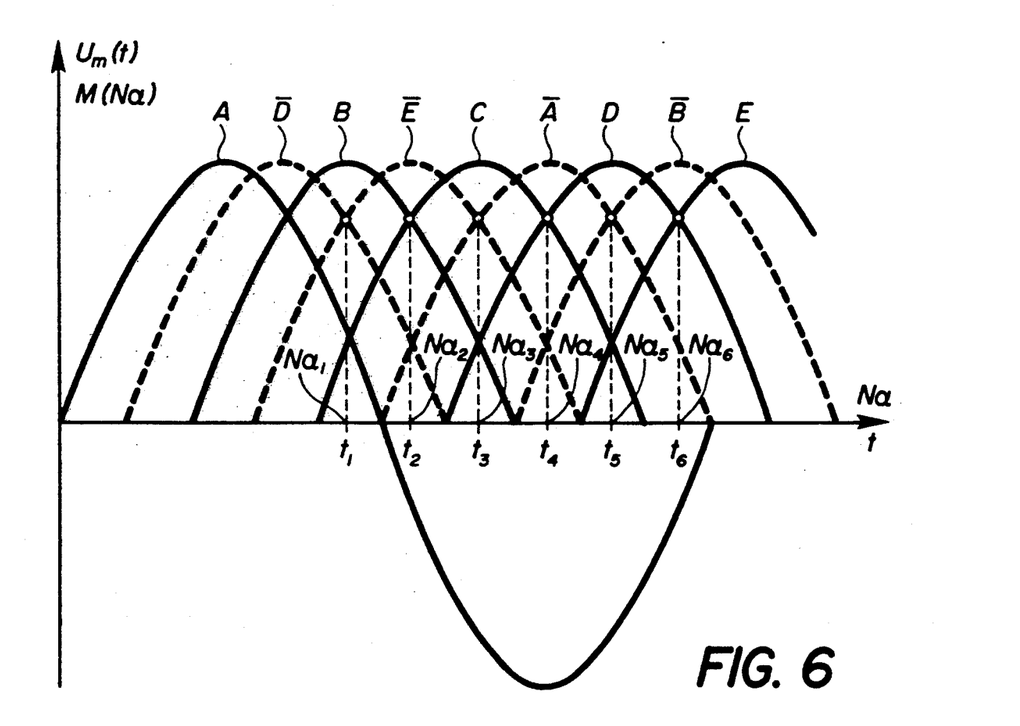

FIG. 4 shows schematically the case of a five-phase motor with five elementary coils $A_1$ to $E_1$. In the supply state represented, the coils $A_1$, $B_1$, $C_1$ are series connected between the terminals 51 and 52, connected to the terminals +, − of a supply source and, concurrently, the coils $E_1$ and $D_1$ are connected to the same terminals 1 and 52. When one applies the usual conventions, this state is written $ABC\overline{D}\overline{E}$. The common connection point 53 of the coils $E_1$ and $D_1$ is connected to a first input of a comparator 54, while the second input thereof is connected to the median point of a voltage divider represented by the resistors 55 and 56, series connected between the terminals of the power supply source. The comparator 54 enables the detection, as in the previous cases, of the instant when the potential at the terminal 53 will be equal to the reference potential defined by the voltage divider 55, 56. In FIG. 6, which is an illustration similar to that of FIG. 5, this instant is designated $t_1$, corresponding to a position $N\alpha_1$ of the rotor, to be detected.

The complete circuit corresponding to the case of the five-phase motor comprises, quite obviously, five different comparators connected by one of their inputs to the different common connection points of the elementary coils and by their other input to the median point of the voltage divider. The transition appearing at the output of these comparators is used in logical circuits similar to those described previously.

This control circuit thus permits the detection, for each complete supply cycle of the motor, of ten particular positions of the rotor spaced by 36° electrical, six of which, $N\alpha_1$ to $N\alpha_6$, are indicated in FIG. 6.

In the case of four-phase motors, as in the case of the two-phase motors according to FIG. 1, it is to be noted that the reference potential is preferably provided by the winding itself, which results in an additional simplification, illustrated by the case described in relation to FIG. 1.

Various versions of the present circuit and their realization are obvious to those skilled in the art and they all permit the obtaining, irrespective of the form of the supply current, of a commutation control signal, readily adjustable in the course of time, by means which are extremely simple and economical.

I claim:

1. A control circuit for an electric motor without a collector, of the type comprising a rotor having at least one pair of magnetic poles, and a stator provided with a polyphase winding comprising several elementary coils of the same impedance, said control circuit comprising electronic commutation means arranged for connecting selectively the elementary coils of the different phases, according to a cycle of successive supply states, to the terminals of a current source, under the effect of a commutation control signal, means for detecting the voltages appearing at the terminals of elementary coils, and means for generating, from said detected voltages, said commutation control signal, wherein, the elementary coils of the winding being connected together in series, the control circuit comprises comparator means for generating, in each supply state, a detection signal at the passage through a reference value of the potential of the common connection point, non-connected to the current source, of two consecutive elementary coils belonging to different phases, the means for generating said commutation control signal being controlled by said detection signal.

2. The control circuit according to claim 1, wherein said electric motor is a polyphase motor with one of said several elementary coils for each phase of said motor, two of said elementary coils being series connected in each of said supply states to the current source terminals, said comparator means comprising comparators, the inputs of which are connected between the common connection point of said two elementary coils, series connected between the current source terminals, and the intermediate point of a voltage divider connected between these current source terminals.

3. The control circuit according to claim 1, wherein said polyphase motor is a two- or a four-phase motor with four elementary coils, said comparator means comprising comparators, the inputs of which are connected between the common connection points of the elementary coils non-connected to the current source.

4. The control circuit according to claim 1, wherein said polyphase motor is a two- or a four-phase motor with four elementary coils, said comparator means comprising two comparators connected permanently between, respectively, two opposite connection points of the elementary coils, and the output signals of these comparators being fed to respective inputs of a first exclusive logical OR gate, the detection signal appearing at the output of this logical gate.

5. The control circuit according to claim 4, comprising at least a second exclusive logical OR gate, the inputs of which are controlled by signals which reflect the successive supply states of the motor, and the output of which is connected to one of the inputs of a third exclusive logical OR gate, the second input of this third logical gate being connected to the output of the first logical gate and the output of this third logical gate being connected to a monostable circuit generating said commutation control signal.

6. The control circuit according to claim 2 wherein said polyphase motor is a three-phase motor with three elementary coils, said circuit comprising three comparators, the first inputs of which are connected respectively to the common connection points of the three elementary coils, and the second inputs of which are connected to said intermediate point of the voltage divider, and the outputs of two of the comparators being connected to the inputs of a first exclusive logical OR gate, the output of this gate and the output of the third comparator being connected, respectively, to the inputs of a second exclusive logical OR gate, the output of which is connected to a monostable circuit generating said commutation control signal.

7. The control circuit according to claim 2, wherein said connection of the inputs of at least one of the comparators is achieved through a delay circuit.

* * * * *

UNITED STATES PATENT AND TRADEMARK OFFICE
CERTIFICATE OF CORRECTION

PATENT NO. : 5,194,787
DATED : March 16, 1993
INVENTOR(S) : luciano Antognini It is certified that error appears in the above-identified patent and that said Letters Patent is hereby corrected as shown below:

In column 3, line 1, after the second "equal sign" please change "$U_{a2} \pm U_{b2}$" to -- $U_{a2} + U_{b2}$ --.

In column 3, line 12, please change "$U_{42,44} = U_{b1} U_{a2}$" to -- $U_{42,44} = U_{b1} - U_{a2}$ --.

In column 3, line 21, please change "$U_{42,44} = -U_{a1}$" to -- $U_{41,43} = +U_{a1}$ --.

In column 3, line 52, please change "$Na = +\pi/4 \pm n$] and" to -- $Na = -\pi/4 \pm n\pi$ and --.

In column 6, line 5, please change "Na1" to --$Na_1$--.

In column 6, line 19, please change the numeral "1" to --51--.

In column 4, line 40, insert a period after the numeral "14".

Signed and Sealed this

Eleventh Day of January, 1994

*Attest:*

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,194,787
DATED : March 16, 1993
INVENTOR(S) : Luciano Antognini

It is certified that error appears in the above-identified patent and that said Letters Patent is hereby corrected as shown below:

In column 3, line 1, after the second "equal sign" please change "$U_{a2}-U_{b2}$" to -- $U_{a2}+U_{b2}$ --.

In column 3, line 12, please change "$U_{42,44}=U_{b1}U_{a2}$" to -- $U_{42,44}=U_{b1}-U_{a2}$ --.

In column 3, line 21, please change "$U_{42,44}=-U_{a1}$" to -- $U_{41,43}=+U_{a1}$ --.

In column 3, line 52, please change "$Na=+\pi/4\pm n$]  and" to -- $Na=-\pi/4\pm n\pi$ and --.

In column 4, line 23, please change "FIG. 2" to -- FIGS. 2A to 2D --.

Figure 2A:
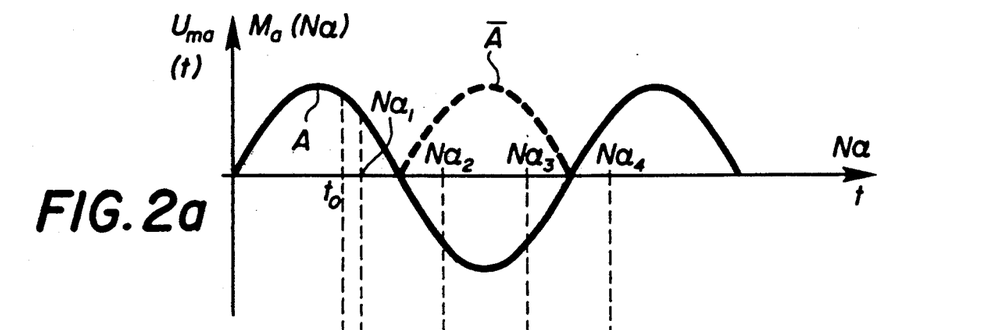
FIGS. 2A–2D show diagrams representing the moments and the voltages appearing in the circuit of FIG. 1.
Figure 2B:
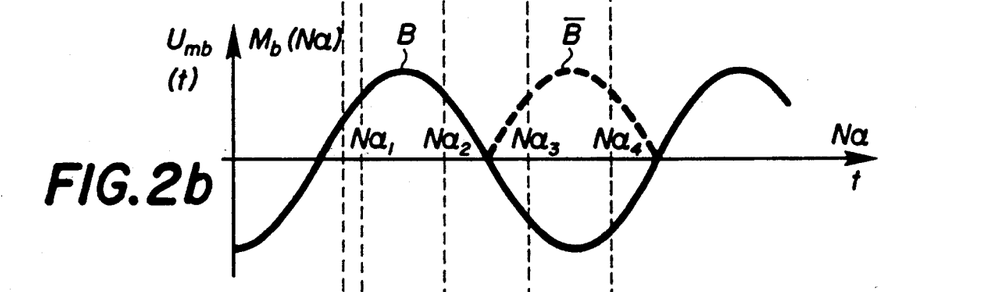
Figure 2C:
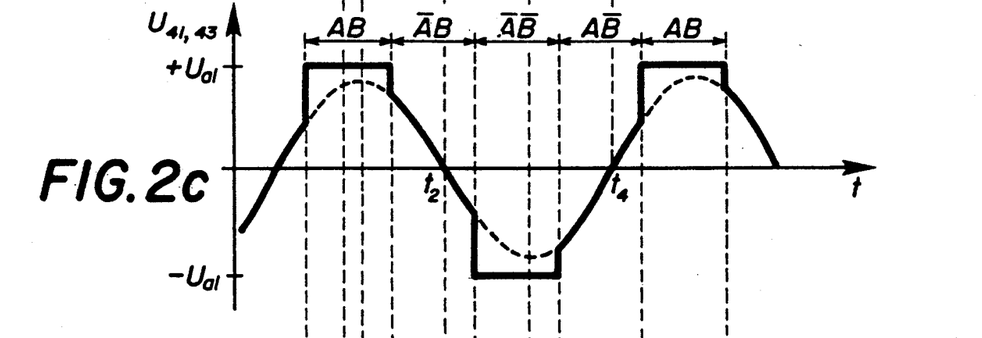
Figure 2D:
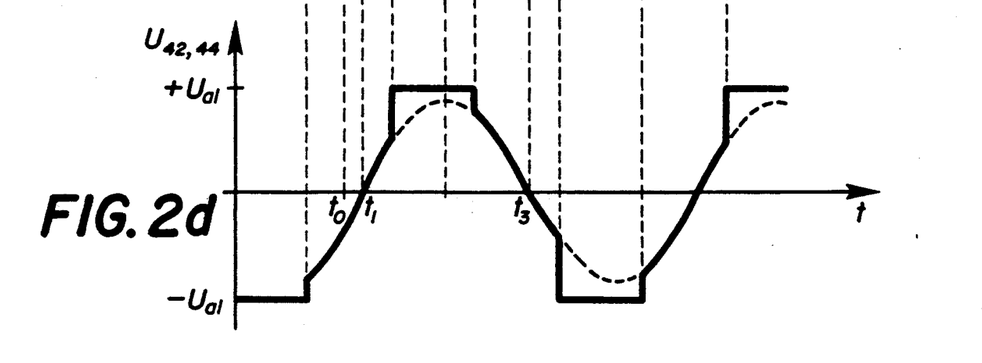

In column 4, line 28, please change "FIG. 2" to -- FIG. 2D --.

In column 4, line 31, please change the numeral "84" to -- 8 --.

UNITED STATES PATENT AND TRADEMARK OFFICE
CERTIFICATE OF CORRECTION

PATENT NO. : 5,194,787

DATED : March 16, 1993

INVENTOR(S) : Luciano Antognini

It is certified that error appears in the above-identified patent and that said Letters Patent is hereby corrected as shown below:

In column 4, line 37, please change "$N_1$" to -- $Na_1$ --.

In column 4, line 40, insert a period after the numeral "14".

In column 5, line 25, please change "$A, \bar{B}, \bar{C}$" to -- $\bar{ABC}$ --.

In column 5, line 30, please change "$N_0$" to -- $Na_0$ --.

In column 6, line 5, please change "Na1" to -- $Na_1$ --.

In column 6, line 6, please change "causes" to -- cause --.

UNITED STATES PATENT AND TRADEMARK OFFICE
CERTIFICATE OF CORRECTION

PATENT NO. : 5,194,787
DATED : March 16, 1993
INVENTOR(S) : Luciano Antognini

It is certified that error appears in the above-identified patent and that said Letters Patent is hereby corrected as shown below:

In column 6, line 7, please change "0 to 1" to -- 1 to 0 --.

In column 6, line 19, please change the numeral "1" to -- 51 --.

This certificate supersedes Certificate of Correction issued January 11, 1994.

Signed and Sealed this

Twenty-eight Day of March, 1995

Attest:

BRUCE LEHMAN

*Attesting Officer*  *Commissioner of Patents and Trademarks*